United States Patent Office.

LYMAN BRADLEY AND THOMAS D. PHILLIPS, OF BUFFALO, NEW YORK, ASSIGNORS TO THEMSELVES AND A. D. DENNY, OF SAME PLACE.

Letters Patent No. 99,628, dated February 8, 1870.

IMPROVEMENT IN PRESERVING FRUITS, VEGETABLES, &c.

The Schedule referred to in these Letters Patent and making part of the same.

We, LYMAN BRADLEY and THOMAS D. PHILLIPS, of the city of Buffalo, in the county of Erie, and State of New York, have invented a certain Improved Process for Preserving Fruit, Vegetables, and Meat, of which the following is a specification.

The fermentation and putrefaction of fruits, vegetables, and meats result from the presence of water, oxygen, and soluble albumen therein; consequently, the preservation thereof depends on the exclusion of the first two, and the coagulation of the last-named substance.

Among the various methods which have been adopted for preserving fruits, vegetables, &c., with the least change from their natural condition as to flavor, &c., the most successful one appears to be the combination of an antiseptic agent with a parboiling process, which coagulates the albumen, and prevents the permeation of air and moisture.

A late process of this kind, patented by D. M. Mifford, September 22, 1868, consists in first treating or charging the article to be preserved with sulphurous-acid gas, and then subjecting the same to heat, for the purpose of coagulating the albumen, and expelling the excess of acid with which the article has been charged.

Although sulphurous acid, as an antiseptic, is the best known for the purpose specified, and the parboiling process is of the greatest importance in the art, yet the above-described process has been found comparatively impracticable, for the following reasons:

First, although only a minute quantity of the sulphurous acid is required, and can be used without imparting a disagreeable taste to the fruit or other article treated with it, yet, an excessive quantity is required to be employed in order to insure a thorough diffusion of the same throughout the body of the article, which excess has to be removed by the subsequent heating-process, requiring the greatest care and skill in the manipulation.

Second, in order to avoid this unpleasant taste, and to expel this excessive quantity of gas, a much greater degree, and longer continuance of heat are required, than is necessary to properly coagulate the albumen contained in the article treated, which destroys the structure of the fruit, or the outer portion thereof, according to its size and delicacy, causing the different pieces or articles to cohere in a mass.

Third, in expelling the superfluous acid by steam, the acid is left unequally distributed, the central portion of the article treated containing a much greater quantity, whereas, if there is to be any difference, the outer or exposed surface should contain the most.

Fourth, a great amount of time and labor is unnecessarily consumed.

Fifth, the more delicate fruits cannot be preserved by this method, as either a deleterious quantity of the acid will remain in the fruit, or else its delicate structure will be destroyed by the heat, in effecting the removal of the excess of acid.

The object of our invention is to obtain the full benefits of the use of sulphurous acid, or its equivalent antiseptic agent, together with the parboiling-process, and, at the same time, avoid the objections above specified.

To accomplish this, our invention consists in combining the two processes of charging the fruit, vegetable, or other article to be preserved, with the sulphurous-acid gas, or its equivalent antiseptic agent, and coagulating the albumen, in one operation, by mixing the sulphurous-acid gas with the steam, as or before it enters the vessel containing the article to be preserved, whereby the gas is properly diluted by commingling with the steam, and is uniformly diffused throughout the contents of the vessel with the steam, the penetrating character of which enables the articles to be properly charged with the gas, even before the parboiling or coagulating-process is completed.

The quantity of acid required can be readily determined by experiment, a very small quantity, when diluted and diffused by our improved process, being sufficient.

The combined gas and steam is applied to the fruit or other article, placed in a close steam-tight vessel, by injecting it into the mass, the amount of gas, and the degree of heat, depending, to a certain extent, on the nature and delicacy of the article being treated, and whether it is designed to be kept, after treatment, in air-tight vessels.

Only the more delicate fruits require, for their preservation, to be kept in air-tight vessels, a cover, fitting ordinarily tight, without sealing, being sufficient in ordinary cases.

The more delicate fruits, such as berries, can be only slightly heated without disintegration. For the preservation of these, our improved process is specially applicable, as the gentle heat permissible is sufficient to cause their proper impregnation by the gas.

By the use of our improvement, all of the ordinary fruits and vegetables can be preserved for a long period, and still retain the natural shape, appearance, and taste, which distinguish one from the other, as the moderate heat required to coagulate the albumen does not materially affect their flavor or texture.

The advantages of our improved process, as to economy of time and labor, and the saving of gas, the facility with which the gas and heat are applied and regulated to the varying requirements of the different articles to be treated, are obvious.

What we claim, as our invention, is—

Preserving fruits, vegetables, &c., by the conjoint and simultaneous application of steam and sulphurous-acid gas, or other equivalent antiseptic agent, whereby the latter, in the required quantity, properly diluted, is equally diffused throughout the mass, during the parboiling-process, substantially as hereinbefore set forth.

LYMAN BRADLEY.
T. D. PHILLIPS.

Witnesses:
JOHN J. BONNER,
VICTOR V. BECKER.